United States Patent
Adey et al.

(10) Patent No.: US 8,375,627 B2
(45) Date of Patent: Feb. 19, 2013

(54) METHOD AND APPARATUS FOR ALL-TERRAIN LARGE-SCALE PRODUCTION OF ALGAE

(75) Inventors: Erik T. Adey, Clear, AK (US); Walter H. Adey, Reedville, VA (US)

(73) Assignee: Hydromentia, Inc., Ocala, FL (US)

( * ) Notice: Subject to any disclaimer, the term of this patent is extended or adjusted under 35 U.S.C. 154(b) by 281 days.

(21) Appl. No.: 12/950,212

(22) Filed: Nov. 19, 2010

(65) Prior Publication Data

US 2011/0119999 A1    May 26, 2011

Related U.S. Application Data

(60) Provisional application No. 61/263,160, filed on Nov. 20, 2009.

(51) Int. Cl.
*A01G 7/00* (2006.01)
*A01H 13/00* (2006.01)

(52) U.S. Cl. .......................................... 47/1.4
(58) Field of Classification Search .............. 47/1.4, 47/59 R, 62 C, 62 E, 63
See application file for complete search history.

(56) References Cited

U.S. PATENT DOCUMENTS

| | | | | |
|---|---|---|---|---|
| 4,320,594 | A * | 3/1982 | Raymond | 47/1.4 |
| 4,333,263 | A | 6/1982 | Adey | |
| 4,966,096 | A | 10/1990 | Adey | |
| 5,097,795 | A | 3/1992 | Adey | |
| 5,121,708 | A * | 6/1992 | Nuttle | 119/200 |
| 5,628,879 | A * | 5/1997 | Woodruff | 202/234 |
| 5,715,774 | A | 2/1998 | Adey et al. | |
| 5,851,398 | A | 12/1998 | Adey | |
| 7,536,827 | B2 * | 5/2009 | Busch et al. | 47/62 R |
| 2009/0203115 | A1 * | 8/2009 | Busch et al. | 435/252.1 |

OTHER PUBLICATIONS

Adey et al., "Phosphorus Removal from Natural Waters Using Controlled Algal Production," *Restoration Ecology*, Mar. 1993, pp. 29-39.

\* cited by examiner

*Primary Examiner* — Monica Williams (57) ABSTRACT

A modular all-terrain algal production system that includes a plurality of segments. Each segment is made from one or more trays that are adapted to grow algae on their surface. The trays each have a flange end configured to be coupled to non-flanged end of an adjacent tray to form floways. Each floway has a rotatable surge bucket at one end that is able to hold water and spill the water in a wave down the floway into a catchment. The system is supported on uneven terrain by an adjustable structure arranged to provide each floway with a horizontal inclination.

29 Claims, 7 Drawing Sheets

METHOD AND APPARATUS FOR ALL-TERRAIN LARGE-SCALE PRODUCTION OF ALGAE

CROSS-REFERENCE TO RELATED APPLICATIONS

This application claims the benefit of U.S. provisional application 61/263,160, filed on Nov. 20, 2009, the subject matter of which is incorporated herein by reference in its entirety.

BACKGROUND

The following described method and apparatus relates to the algal production technology which was conceived and developed over a period of about 30 years and patented as U.S. Pat. Nos. 4,333,263, issued Jun. 8, 1982; 4,966,096, issued Oct. 30, 1990; 5,097,795, issued Mar. 24, 1992; 5,851,398, issued Dec. 22, 1998; and 5,715,774, issued Feb. 10, 1998; the disclosures of which are incorporated herein by reference in their entirety. The apparatus and methods described herein are for small to large algal production operations on soft, unstable, or uneven ground, for temporary or experimental purposes, and for rapid, inexpensive deployment and expansion.

Existing large-scale algal production systems marketed under the brand Algal Turf Scrubber®, or ATS systems, include in-ground troughs or "floways." These systems utilize a base of compacted soil, lined with impermeable geomembrane sheets. Existing large scale ATS systems may require extensive grading and ground preparation. Surge units on the more recent systems consist of aluminum and PVC siphon-break water pulsers placed in extensive concrete "headworks," requiring more ground preparation. Since such known surge units are typically laid at or near the ground surface, effluent collection requires ground penetration as well for the concrete spillways and containments. Such in-ground systems are not adjustable to accommodate unstable ground conditions that would result in subsidence or heaving. Also, these known ATS systems are not adjustable to accommodate changes in size, shape and operational parameters including a change of grade, such as might be required to respond to environmental, biological, or production requirements. Moreover, the known permanent ATS unit of several acres may require six months to a year to install.

SUMMARY

The permanent all-terrain algal production systems, or "ATATS" system, described herein can be built on landfills and other unstable ground, are adjustable for changes in the ground surface, and are easily and inexpensively expandable or movable/removable. The ATATS systems may be built without penetrating the ground by using suitable surface level footings or anchors such as large portable concrete blocks. If in-ground footings are required, they may be at discrete locations. ATATS systems may be attached to hard surfaces such as rock, concrete, or asphalt, or such surfaces as shopping mall roofs, by bolting or cabling to suitable anchor points. These ATATS systems are available in a variety of sizes suitable for experimental sampling, small-scale water cleanup, and large scale cleanup and algal production ranging from fractions of an acre to facilities on the order of hundreds or thousands of acres. These systems may be assembled using modular units requiring a minimum of engineering to install such that they could be presented as a package to potential customers. An experienced team should be able to erect permanent ATATS systems of several acre dimensions in a few weeks.

An ATATS system may be built by constructing floway structures of fiberglass, sealed or lined plywood, or similar water resistant material from modular components and supporting the structure above the ground surface with a framework of wood or metal. These supporting structures should be dimensionally stable and adjustable, preferably to within one-eighth inch vertically, to maintain efficient slope characteristics.

DETAILED DESCRIPTION OF PREFERRED EMBODIMENTS

Figure 1:
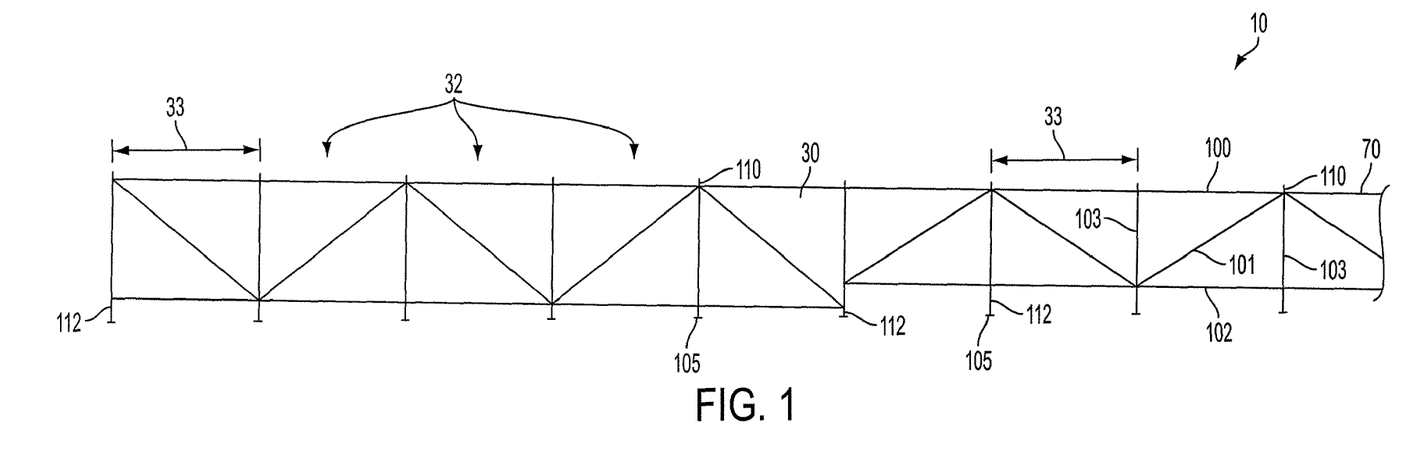
FIG. 1 is a partial side view of a support structure for an all-terrain algal production system according to a preferred embodiment.
Figure 2:
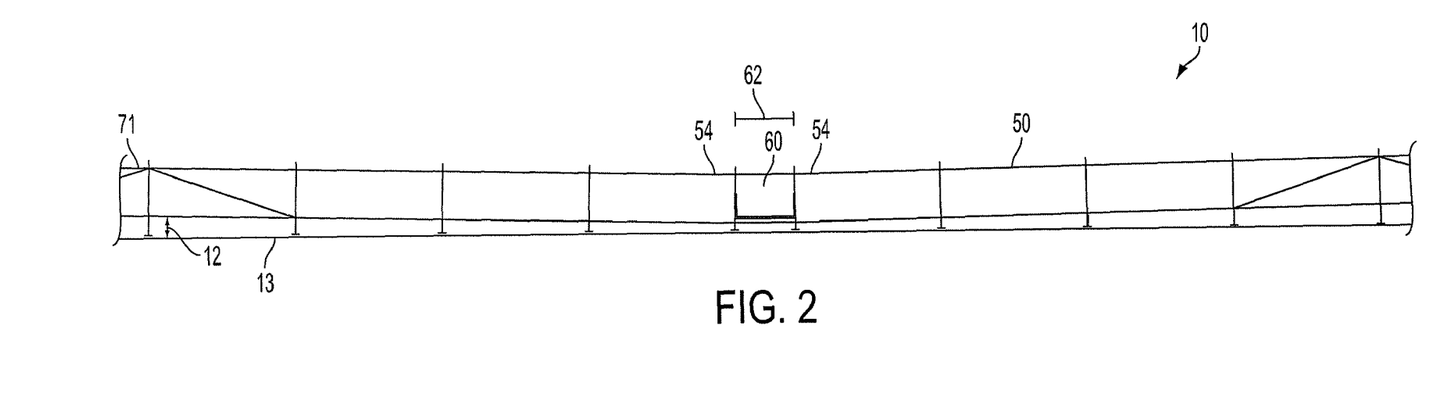
FIG. 2 is another partial side view of the support structure of the algal production system of FIG. 1.
Figure 3:
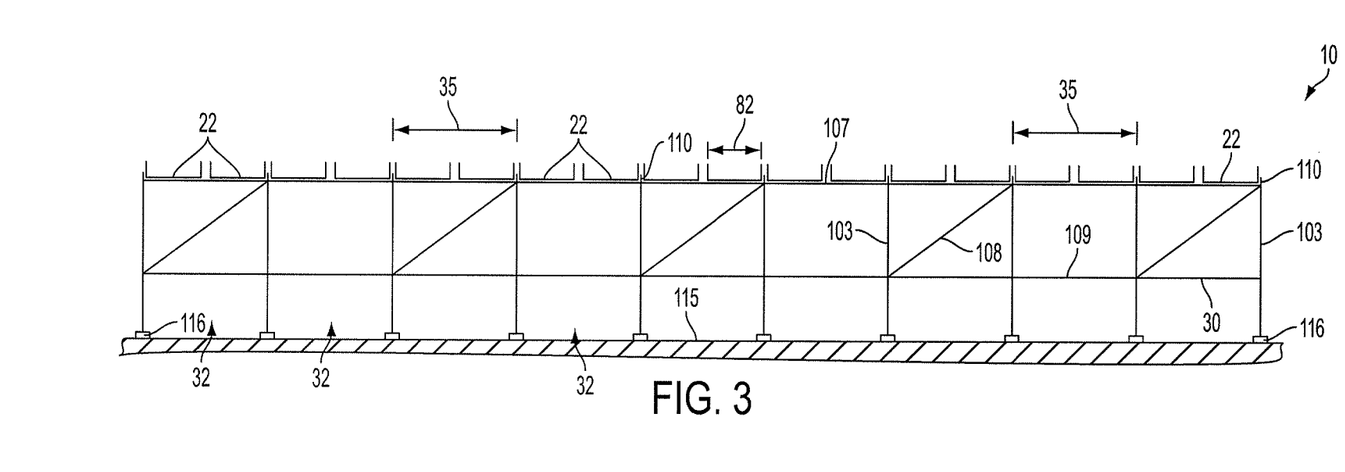
FIG. 3 is an end view of the support structure of FIG. 1.

Referring now to the drawings, where like reference numerals designate like elements, there is shown in FIGS. 1 through 3 an ATATS algal production system 10 according to a preferred embodiment.

Figure 4:
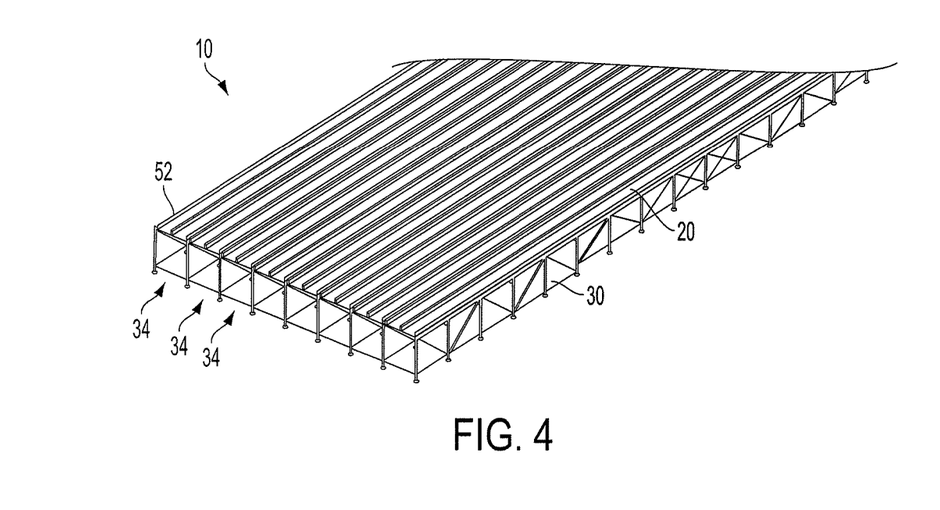
FIG. 4 is a perspective view of an end portion of the run module of FIG. 6.
Figure 7:
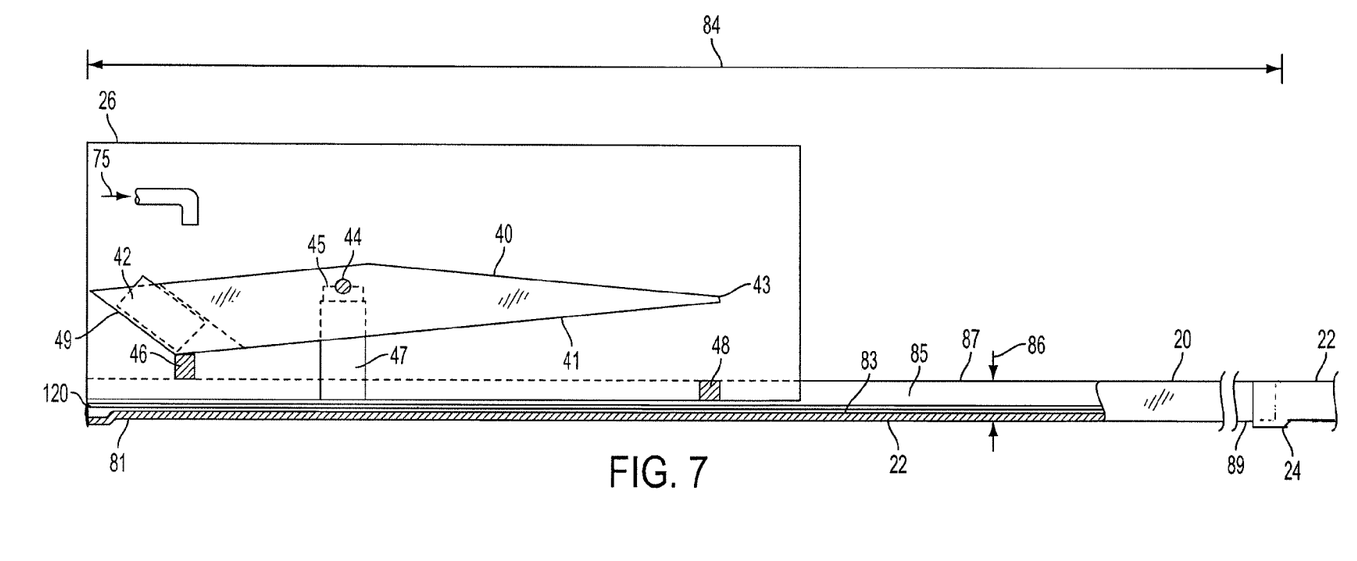
FIG. 7 is a view taken along section line VII-VII of FIG. 8.
Figure 8:
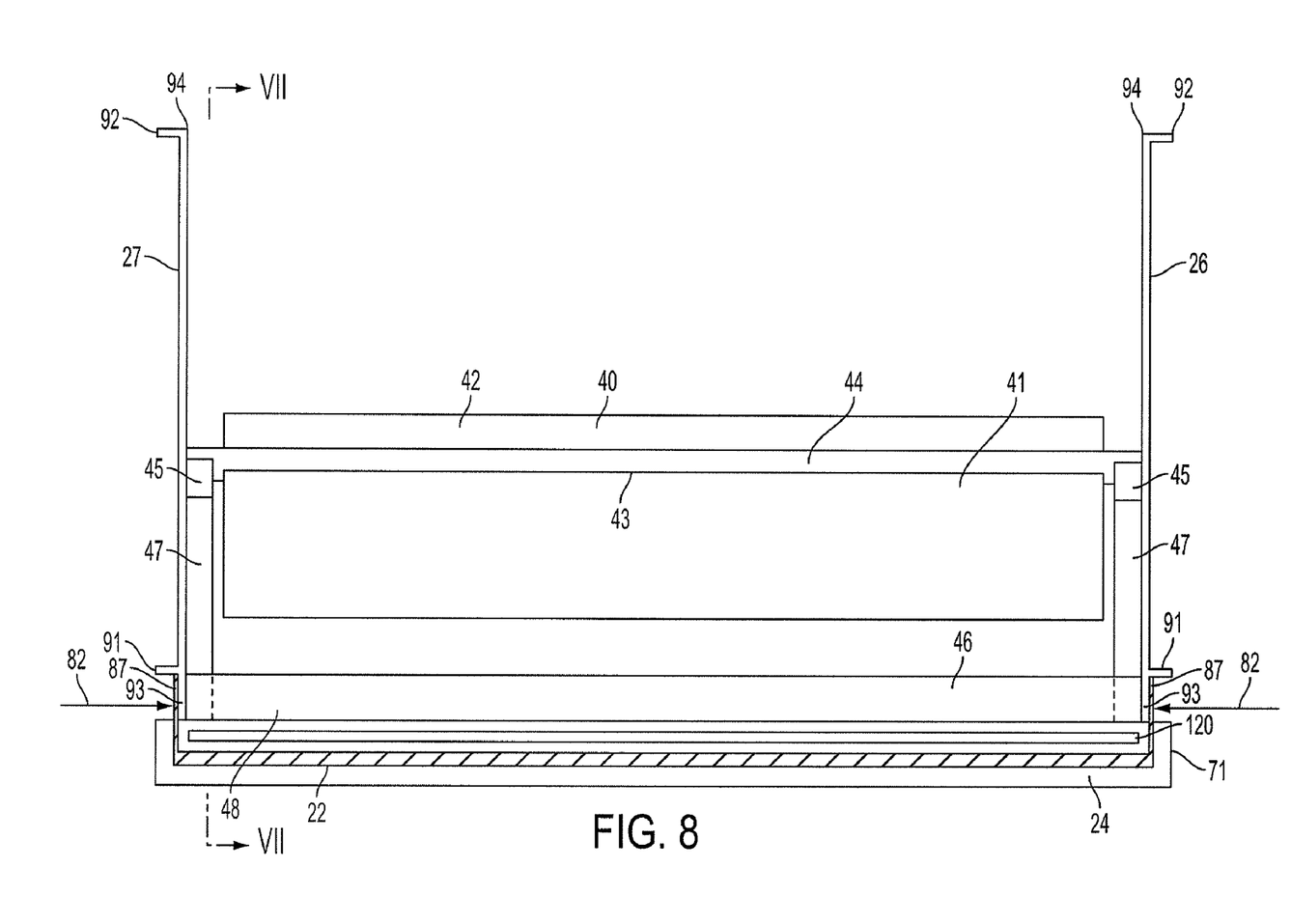
FIG. 8 is an end view of a floway with a surge bucket and two splash guards.

As shown in FIG. 4, the ATATS algal production system 10 includes a number of floways 20 supported by a vertically adjustable scaffold 30, with surge of water for each provided by a bucket 40 (FIG. 8) hinged within a pair of splash shields or guards 26 and 27 (FIG. 8). The bucket 40 functions like a tipping bucket as described in U.S. Pat. No. 4,966,096. The floways 20 are constructed from modular pieces or "trays" 22 arranged end to end. As shown in the illustrated embodiment of FIG. 3, each of the trays 22 has an upper tray end 81, a lower tray end 89, a tray bottom 83 and a pair of tray sides 85. As shown in FIGS. 7 and 8, a tray 22 may have a width 82 of approximately four feet, a length 84 of about ten feet, with the tray sides 85 having a height 86 of about four inches, although other sizes might be used if required. The trays 22 may be constructed of fiberglass, plastic, metal, ceramics, or other water resistant materials.

As shown in FIG. 7, the flanges 24 are formed preferably at the upper end 81 of each tray 22 to be wider and accept the un-flanged lower end 89 of an adjacent tray 22 to allow overlapping connection of the trays 22 to produce a trough-shape floway 20 of any desired length. In another embodiment (not shown), flanges 24 may be formed at the lower end 89 of each tray 22 while the upper end 81 of each tray 22 is un-flanged. The floway 20 contains an algal growth medium 120, upon which algae will grow within the floway 20.

Aluminum, or other suitable material, bar flat stock of about one inch by one sixteenth inch or other suitable dimension may be added to or molded integrally in each connecting flange 24 allowing screw fastening or other fastening methods, and providing attachment grooves for hose clamps to anchor the floways 20 to the supporting widthwise top crossbars 107 of the support 30. Alternatively, wood, metal, or plastic planks may be attached to the supporting widthwise top crossbars 107 to which the floways 20 may be screw-fastened or otherwise fastened at the joints. Attachment of the floway 20 to the support structure may be done in many ways, providing that leakage from the floway 20 is substantially prevented, and water flow and algal harvest are not substantially impeded.

FIG. 7 illustrates a side view and FIG. 8 illustrates an end view of the surge bucket 40 coupled to the tray 22 that is at the upper end 81 of a floway 20. The surge bucket 40 is rotatably attached to an axle 44 that extends across the width of tray 22. The surge bucket 40 may be formed of fiberglass, plastic, metal, ceramic, or other water resistant material. Axle supports 47 are located on each side of tray 22. Each axle support 47 has an axle bearing 45 that accepts one end of the axle 44. The axle bearing 45 is designed to allow the axle 44 to rotate thereon. The axle bearing 45 may be high-density polyethylene (HDPE), graphite or some other type of material that reduces friction between components that move relative to each other.

FIGS. 7 and 8 further illustrate a counterweight 42 located in the surge bucket 40. The counterweight 42 is held offset from the axle 44 toward the back end 49 of the surge bucket 40. When the surge bucket 40 is not completely filled with water, the counterweight 42 rotates the surge bucket 40 so that the back end 49 of the surge bucket 40 rests on a backstop 46. The backstop 46 extends across and above the tray 22 and is coupled to the guards 26 and 27 and/or to the bottom of the floway tray. When the surge bucket 40 fills with water from a water supply 75, the surge bucket 40 rotates forward and pours the water into the tray 22. The surge bucket 40 rotates forward until the nose 43 of the surge bucket 40 contacts a nose stop 48. As water pours from the surge bucket 40, the nose 43 of the surge bucket 40 rests on the nose stop 48. The nose stop 48 extends across and is located within the tray 22 and may be coupled to the guards 26 and 27. The nose stop 48 may provide additional structural support for the splashguards 26 and 27. In another embodiment, the nose stop 48 may be a soft pad or cushioning piece located in the bottom of the tray 22 of the floway 20.

FIG. 7 illustrates the splash guard 26 located on the far side of the surge bucket 40, while the splash guard 27 (FIG. 8) is on the near side of the surge bucket 40. FIG. 8 shows both of the splash guards 26, 27 arranged on either side of the surge bucket 40. The splash guards 26, 27 may be coupled to the tray 22 and have flanges 91 that rest on the top edges 87 of the sides 85 of the tray 22. The splash guards 26, 27 have lower portions 93 that extend below the flanges 91 and inside the sides 85 of the tray 22. The splash guards 26, 27 also have flanges 92 at their top portions 94. The flanges 92 extend away from the surge bucket 40. The splash guards 26, 27 may be formed of fiberglass, metal, plastic, ceramic, or other water resistant material. Splash guards 26, 27, function to reduce water splash out of the tray 22 and to protect the surge bucket 40 from the effects of wind while it is operating. In another embodiment (not shown), the nose stop 48, the back stop 46, the axel supports 47, and the axel bearing 45 are assembled using appropriate supports to form a unitary structure that may be placed within the floway 20. In that embodiment, the splash guards 26, 27 may be attached to the unitary structure.

One floway 20 of any length, with its associated splash guards 26, 27 and surge bucket 40, would constitute a "floway unit" 50, and may be mounted on supports of any width and height to suit requirements. As shown in FIG. 2, a slope angle 12 of the bottom 83 of the floway 20, with respect to the horizontal 13 between the higher upper floway end 81 and the lower floway end 89 would be constructed into the support structure of varying degree to suit local growing conditions and attached growth media, and would preferably vary from one half percent to two percent. The surge bucket 40 would be at the floway unit 50 upper end 54 (FIG. 6), where the water enters the floway unit 50, and the lower end 52 (FIG. 6) would empty into a suitable catchment 60, whether a trough, channel, pond or other catchment. In another embodiment, the floway unit 50 may not have the splash guards 26, 27. If there are no splashguards 26, 27, then the nose stop 48 and the backstop 46 would extend across at least a portion of the width of the tray 22 and be couple to the sides 85 or the bottom 83 of the tray 22, or to a unitary support structure placed in the floway.

Various support structures 30 may be used, including support structures made of wood and/or metal, such as steel. The preferred support structure 30 is a "system scaffold," including vertical "standards" with protruding attachment flanges at regular intervals, to which are attached horizontals and diagonals. "System scaffold" is an industry category characterized by fixed attachment points and sized components, produced by various manufacturers in the United States and other countries. Alternate scaffold types may be used, such as pipe and clamp, I-beam, or others, including bamboo and rope, but labor costs would be significantly higher for each of these in large scale projects. Also considered are structural steel systems such as Unistrut® systems (www.unistrut.com), which may have specific applications but would again be labor-intensive. The concept of an ATATS algal production system 10 is not brand or material-specific, but is most cost-effective when used as outlined here.

A preferred scaffolding arrangement, as depicted in FIGS. 1-3, includes support segments 32, where each support segment 32 supports two trays 22. Each segment 32 includes a lengthwise top crossbar 100 and a lengthwise bottom crossbar 102 that are attached between the vertical supports 103. A lengthwise diagonal bar 101 extends diagonally between the vertical supports 103 as needed for stabilization of the support structure. A widthwise top crossbar 107 and a widthwise bottom crossbar 109 are also attached between the vertical supports 103 of segments 32. Further, a widthwise diagonal bar 108 extends diagonally as needed between the vertical supports 103. The vertical supports 103 may have posts 110 that extend above the lengthwise top crossbar 100. The vertical supports 103 also have feet 105 that extend down from the lengthwise bottom crossbar 102. In another embodiment, the segments 32 may not share the vertical supports 103.

In one embodiment, each support segment 32 has a segment length 33 of about ten feet and a segment width 35 of about eight feet. Other lengths and widths are possible and would be determined by the application. FIGS. 1 and 2 illustrate various portions of the support structure 30. In the illustrated embodiment, an upper support section 70 illustrated in FIG. 1 is connected to a lower support section 71 of FIG. 2 with intermediate scaffolding not shown but which, along with the support sections 70, 71, maintain the slope 12 within a desired range. The feet 105 of the support segments 32 may be placed directly on the terrain surface 115 or, where the terrain is too soft to support the support structure 30 without the support structure 30 sinking below the terrain surface115, surface level footings 116 are placed between the feet 105 and the terrain surface 115. The surface level footings may be concrete, flat boards or other suitable materials to protect the feet 105 from damage due to ground contact.

For specific terrain locations where surface level footings 116 will not support the support structure 30, discrete localized below-surface footings may be used. Below-surface footings may also be used if there is a concern that wind forces will be sufficiently high to lift and damage or misalign the floways 20 and structure 30. In the event of any settling or movement of the terrain surface 115, the support structure 30 may be adjusted, preferably near its feet 105 above the terrain surface 115 to maintain the support structure 30 alignment and the angle 12 of the floway 20 within desired ranges.

Figure 5:
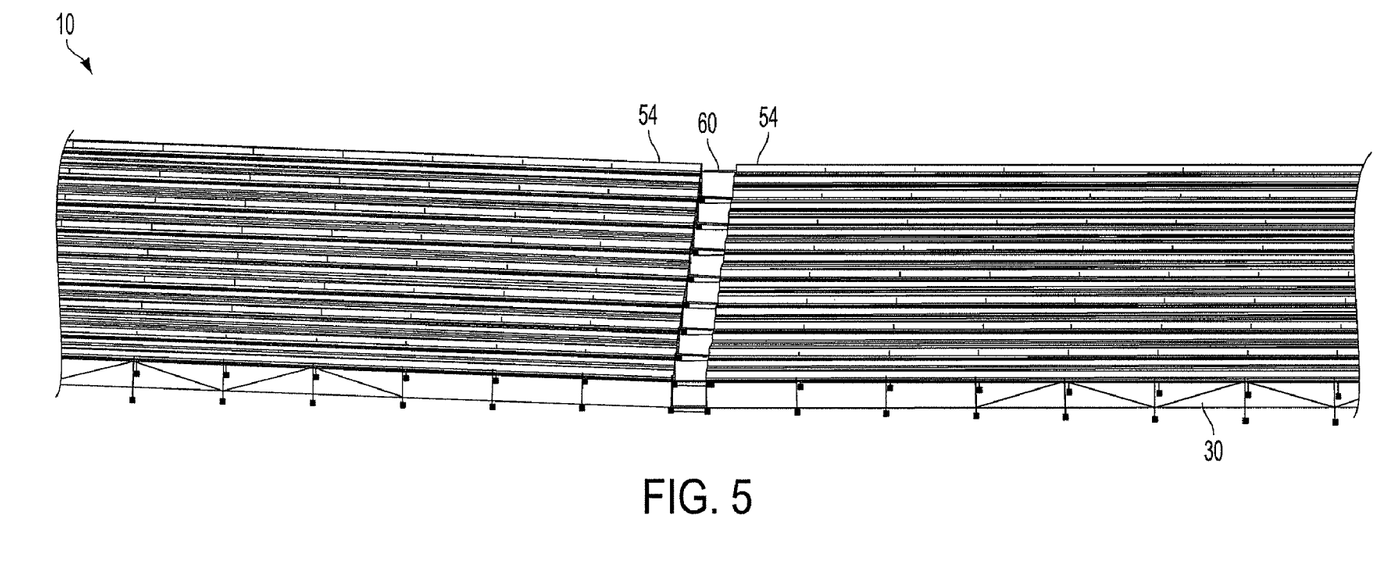
FIG. 5 is a perspective view of a middle portion of the run module of FIG. 6.
Figure 6:
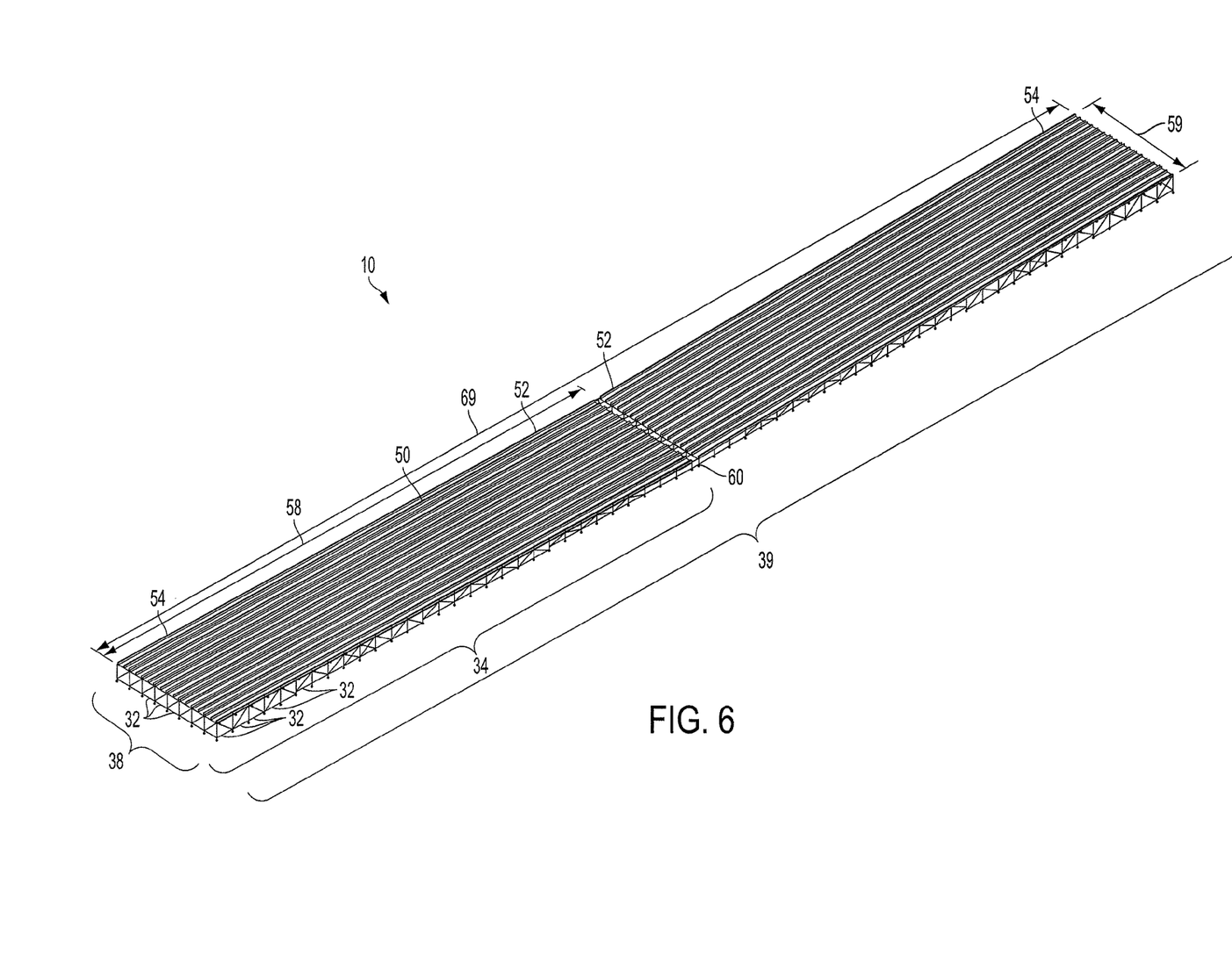
FIG. 6 is a perspective view of a run module used for algae production supported by the support structure of FIG. 1.

FIGS. 4-6 illustrate these support segments 32 connected together into "support sections" 34. In one embodiment, the support sections 34 may have a width 35 of about eight feet and a length 58 of about three hundred feet (also the approximate length of the corresponding floway unit 50), or other lengths determined by the particular application, for example, as part of a one-acre "run module" 39. In the embodiment illustrated in FIGS. 4-6, the two side-by-side trays 22, supported by each support segment 34, are coupled together. Alternatively, the trays 22 may be separated as illustrated in FIG. 3.

A plurality of supported floway units 50, connected in parallel constitute a "floway gang" 38. In one embodiment, a floway gang 38, including eighteen parallel floway units 50, may have a width 59 of about seventy-two feet and a length 58 of about three hundred feet, being supported by nine support sections 34. Two floway gangs 38 may be connected together at their lower ends 52 by a catchment trough 60, which may be formed of any material suitable to transport water, such as, for example, a flexible "pond liner" supported on the sides by attachment to the scaffold piping. In one embodiment, the catchment trough 60 may have a width 62 of about four feet. A combination of two floway gangs forms a "floway run module" 39. In one embodiment, a floway run module 39 may include thirty-six floway units 50, and have a width 59 of about seventy-two feet and a length 64 of about six hundred four 604 feet, covering one acre of ground. The floway run module 39, as a one-acre ATATS system, would have algal growth medium surface area of 37,044 square feet or 0.85 acre. Flow capacity at ten gallons per minute per foot width would allow approximately two million gallons per day. Flow rates may be adjusted for given growing conditions.

Figure 9:
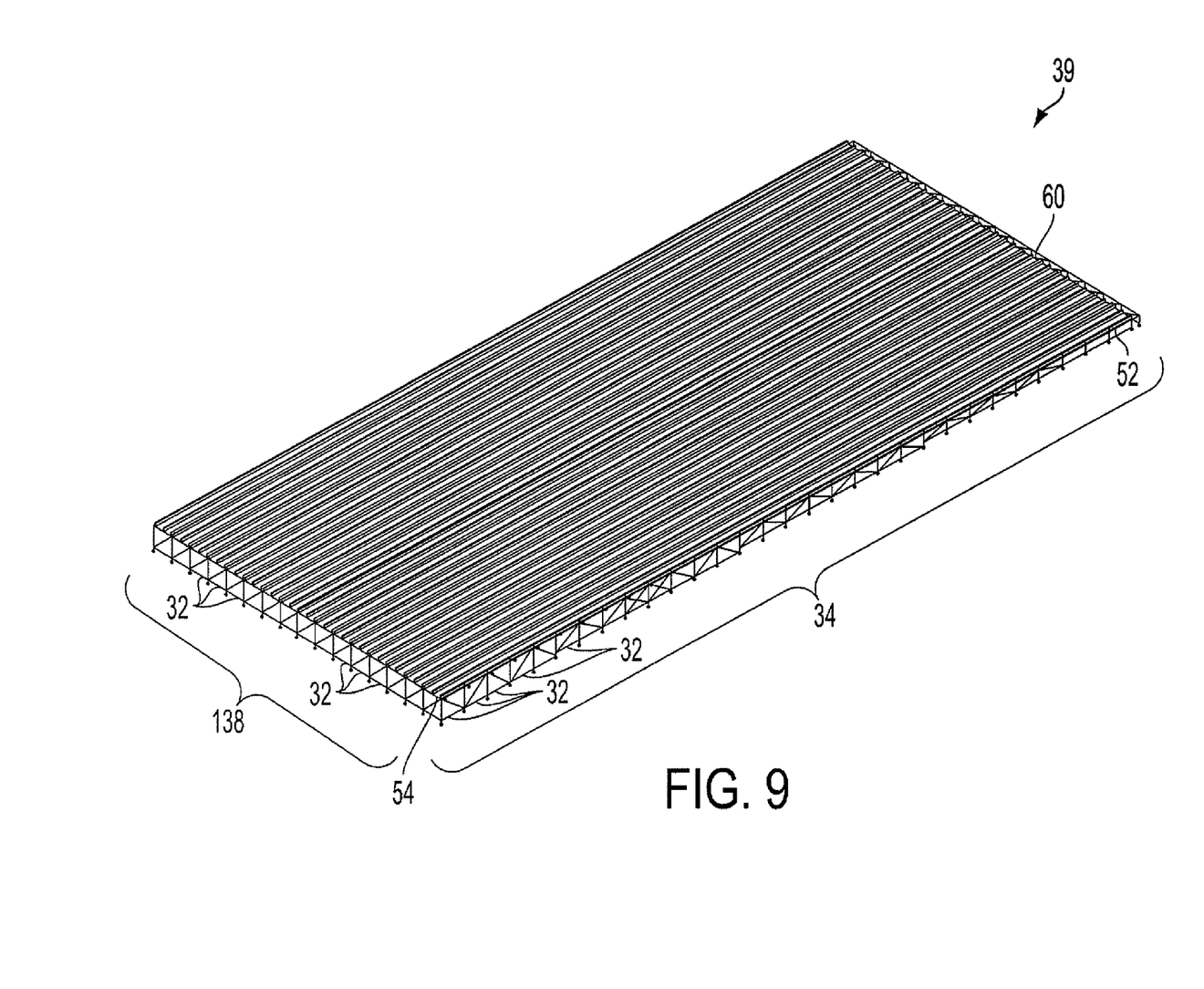
FIG. 9 is a view of another arrangement of a floway gang of FIG. 6.

FIG. 9 illustrates a configuration of a floway gang 138 that is as wide as the two floway gangs 34, thus covering as much area as the floway run module 39 of FIG. 6. This arrangement allows the surge bucket 40 of each floway section 38 of the gang 138 to be located at one end of the structure covering the same area as the floway run module 39. The lower end 52 of each floway section 38 may empty into the catchment 60 or into a water body or any other feature that may accept water flow from the floway sections 38.

This floway run module arrangement allows expansion into a multi-acre facility, with central effluent collection and external access to the inflow ends for maintenance. An alternate arrangement would involve conjoining floway gangs along their longitudinal sides such that inflow ends and effluent ends are both accessible. A collection of floway gangs, floway run modules, support sections, or support segments, separately or in combination may form a system that is deployed for algal production.

Although in FIG. 3, the terrain surface 115 appears level, in practice the terrain surface may be unlevel, uneven, sloped or otherwise contoured. In the floway run module 39, the vertical support 103 of each segment 32 has a vertically adjustable screw 112 coupled to each foot 105 that allows adjustment of the vertical position of the foot length to contact the terrain surface 115 to establishment of a precisely aligned flat surface for the floways and the desired slope 12, as well as for re-adjustment with ground subsidence that may occur over time. These adjustment screws 112 are an available option in the commercial scaffold systems.

It should be apparent that many modifications and variations of the preferred embodiments as hereinbefore set forth may be made without departing from the spirit and scope of the present invention. The specific embodiments described are given by way of example only. The invention is limited only by the terms of the appended claims

What is claimed as new and desired to be protected by Letters Patent of the United States is:

1. A modular, all-terrain algal production system comprising:
    a support section having a first and second end;
    a floway adapted to grow algae on its surface, the floway extending between the first and second ends of the section;
    the support section adapted to support the floway on uneven terrain and being adjustable to provide the floway with a horizontal inclination within a desired range between the first and second ends of the support section,
    wherein the floway includes a plurality of trays coupled together to form the floway, the trays being adapted such that a first end of one tray may be coupled to the second end of an adjacent tray; and
    further comprising a surge bucket rotatably mounted on an axle above the floway to allow water from the surge bucket to spill in a wave down the floway.

2. The algal production system of claim 1, wherein each tray including a first flanged end and a second end, the first flanged end being adapted to be coupled to a second end of an adjacent segment to form the floway.

3. The algal production system of claim 1, wherein the floway is elevated above ground.

4. The algal production system of claim 1, wherein the horizontal inclination ranges from about one-half percent to about two percent.

5. The algal production system of claim 1, further comprising a first splash guard arranged on one side of the surge bucket.

6. The algal production system of claim 1, further comprising a floway gang including a plurality of floways and a plurality of surge buckets, wherein each floway is coupled to one of the plurality of surge buckets.

7. The algal production system of claim 6, wherein each of the plurality of floways is coupled to a water catchment.

8. The algal production system of claim 1, wherein the adjustable support structure is adjustable in a vertical direction to provide the horizontal slope.

9. A modular, all-terrain algal production system comprising:
    a floway gang having a first and second end;
    the gang including a plurality of floway units;
    each floway unit including: a floway adapted to grow algae on its surface, the floway extending between the first and second ends of the gang; and a surge bucket coupled to the floway and arranged to allow water from the surge bucket to spill in a wave down the floway;
    wherein the plurality of floway units are coupled together such that the floways of the floway units are arranged parallel to each other; and
    an adjustable structure supporting the floway gang on uneven terrain, the structure providing a horizontal inclination within a desired range between the first and second ends of the gang.

10. The algal production system of claim 9, wherein a plurality of trays are coupled together to form each of the plurality of floway units, each tray including a first flanged end and a second end, the first flanged end being adapted to be coupled to a second end of an adjacent segment to form the floway.

11. The algal production system of claim 9, wherein the floway gang is elevated above ground.

12. The algal production system of claim 9, further comprising a water catchment coupled to the second end of the floway gang, wherein the water from the surge bucket of any one of the plurality of floway units is channeled into the catchment.

13. The algal production system of claim 9, wherein the horizontal inclination ranges from one-half percent to two percent.

14. The algal production system of claim 9, wherein the surge bucket is mounted to rotate on an axle above the floway.

15. The algal production system of claim 14, further comprising a first splash guard arranged on one side of the surge bucket.

16. The algal production system of claim 14, wherein the surge bucket has a counterweight offset from the axle towards the first end of the floway.

17. The algal production system of claim 9, wherein the adjustable support structure is adjustable in a vertical direction to provide the horizontal slope.

18. A modular, all-terrain algal production system comprising:
- a plurality of trays, each adapted to accept algae growth medium, the plurality of trays having first and second ends, each first end having a flange configured to be coupled to the second end of an adjacent tray,
- wherein the plurality of trays are coupled together to form a plurality of floways, the floways being arranged such that the first end of a tray of a floway is coupled to the second end of a an adjacent tray of the floway to form the floway,
- wherein the plurality of floways are coupled together to form a plurality of floway gangs, the floways being coupled together such that the trays of adjacent floways are arranged parallel to each other,
- wherein two of the plurality of floway gangs are coupled together to form a floway run module,
- wherein the plurality of floway run modules are coupled together to form the algal production system, the floway run modules being coupled together such that the trays of the run modules are arranged parallel to each other,
- a support structure adjustable in a vertical direction, the support structure being arranged to support each of the plurality of floway gangs on uneven terrain such that the floways of the respective floway gangs are arranged at a horizontal slope of between one-half degrees to two degrees;
- a water catchment coupled to a lower end of each floway gang and arranged to collect water from the lower end of each floway gang; and
- a plurality of surge buckets, one surge bucket being arranged at an upper end of each floway, wherein each surge bucket is mounted on and rotatable about an axle between a backstop and a nose stop, each surge bucket comprising a counterweight offset from the axle towards the upper end of each floway and first and second splash guards arranged on either side of each surge bucket.

19. The algal production system of claim 18, wherein the adjustable support structure is adjustable in a vertical direction to provide the horizontal slope.

20. A method of assembling a modular, all-terrain algal production system, the method comprising the steps of:
- building a first adjustable floway support having a first and second end;
- assembling a first floway by coupling together a plurality of trays, the floway being adapted to grow algae therein;
- coupling the floway to the floway support so that the floway is supported by the floway support; and
- adjusting the floway support to provide the floway with a horizontal inclination between the first and second end.

21. The method of claim 20, wherein each tray has a first and second end, the first end of each tray having a flange configured to be coupled to the second end of an adjacent tray.

22. The method of claim 20, wherein each tray is coupled to the floway support before being coupled to another one of the trays.

23. The method of claim 20, further comprising assembling a second floway from a second plurality of trays.

24. The method of claim 23, further comprising coupling the second floway to the first floway support.

25. The method of claim 20, further comprising readjusting the floway support to maintain the horizontal inclination of the floway.

26. The method of claim 20, further comprising coupling a surge bucket to the floway.

27. The method of claim 20, wherein a first plurality of floways are coupled to the first floway support.

28. The method of claim 27, further comprising expanding the first floway support.

29. The method of claim 28, wherein expanding the first floway support comprises integrating a second adjustable floway support with the first adjustable floway support, wherein the second floway support is able to support a second plurality of floways.

* * * * *